US011325580B2

(12) United States Patent
Pan et al.

(10) Patent No.: US 11,325,580 B2
(45) Date of Patent: May 10, 2022

(54) HYBRID VEHICLE TRANSMISSION CONTROL USING DRIVER STATISTICS

(71) Applicant: Robert Bosch GmbH, Stuttgart (DE)

(72) Inventors: Ziheng Pan, Farmington Hills, MI (US); Shyam Jade, Plymouth, MI (US)

(73) Assignee: Robert Bosch GmbH, Stuttgart (DE)

( * ) Notice: Subject to any disclaimer, the term of this patent is extended or adjusted under 35 U.S.C. 154(b) by 310 days.

(21) Appl. No.: 16/537,972

(22) Filed: Aug. 12, 2019

(65) Prior Publication Data

US 2021/0046918 A1 Feb. 18, 2021

(51) Int. Cl.
*B60W 20/10* (2016.01)
*B60W 10/06* (2006.01)
(Continued)

(52) U.S. Cl.
CPC ............ *B60W 20/10* (2013.01); *B60W 10/06* (2013.01); *B60W 10/08* (2013.01); *B60W 10/10* (2013.01); *B60W 50/0097* (2013.01); *B60W 50/08* (2013.01); *B60K 6/20* (2013.01); *B60W 2420/42* (2013.01); *B60W 2420/52* (2013.01);
(Continued)

(58) Field of Classification Search
CPC ...... B60W 20/10; B60W 10/06; B60W 10/08; B60W 10/10; B60W 50/08; B60W 50/0097; B60W 2540/215; B60W 2710/08; B60W 2710/10; B60W 2420/52; B60W 2420/42; B60W 2710/06; B60W 2710/244; B60W 20/11; B60W 2556/50; B60W 10/26;
(Continued)

(56) References Cited

U.S. PATENT DOCUMENTS 7,360,615 B2 4/2008 Salman et al.
7,758,467 B2 7/2010 Ashizawa et al.
(Continued)

OTHER PUBLICATIONS

Pan et al., "Battery State-of-Charge Pulse-and-Glide Strategy Development of Hybrid Electric Vehicles for VTS Motor Vehicle Challenge", IEEE Vehicle Power and Propulsion Conference, 2018, 7 pages.

(Continued)

*Primary Examiner* — Brian P Sweeney
(74) *Attorney, Agent, or Firm* — Michael Best & Friedrich LLP

(57) ABSTRACT

A multi-layer control mechanism for optimizing performance metrics of a hybrid electric vehicle (e.g., fuel efficiency, drivability, NVH). A first layer generates a policy that defines target engine & motor operating settings for each of a plurality of possible driver demand inputs based on a predicted driver demand profile for a long-horizon period of time. A second layer determines a predicted "short-horizon" driver demand—based, for example, on historical driver data and one or more environmental sensor inputs—and applies a corrective pre-adjustment to the operating settings of the vehicle in response to determining that a pre-adjustment is required in order to apply the target operating settings for the predicted driver demand. A third layer determines constraints to the operating settings required to comply with the additional performance parameters and limits the operating settings applied to the engine and motor(s) to feasible operating settings defined by the constraints.

20 Claims, 5 Drawing Sheets

(51) Int. Cl.
  B60W 10/08    (2006.01)
  B60W 10/10    (2012.01)
  B60W 50/08    (2020.01)
  B60W 50/00    (2006.01)
  B60K 6/20     (2007.10)
(52) U.S. Cl.
  CPC ... *B60W 2540/215* (2020.02); *B60W 2710/06* (2013.01); *B60W 2710/08* (2013.01); *B60W 2710/10* (2013.01); *B60Y 2200/92* (2013.01)
(58) Field of Classification Search
  CPC ...... B60W 10/28; B60Y 2200/92; B60K 6/20; Y02T 90/40; Y02T 10/62
  See application file for complete search history.

(56)  References Cited

U.S. PATENT DOCUMENTS

| | | | |
|---|---|---|---|
| 7,891,450 | B2 | 2/2011 | Soliman et al. |
| 8,565,952 | B2 | 10/2013 | Mehr et al. |
| 9,067,589 | B1 | 6/2015 | Zhao et al. |
| 9,114,806 | B2 | 8/2015 | Wang et al. |
| 9,193,351 | B2 | 11/2015 | Zhao et al. |
| 9,409,565 | B2 | 8/2016 | Bureau et al. |
| 9,545,915 | B2 | 1/2017 | Phillips et al. |
| 9,592,817 | B2 | 3/2017 | Yamazaki et al. |
| 9,718,462 | B2 | 8/2017 | Yamazaki et al. |
| 9,849,869 | B2 | 12/2017 | Frank et al. |
| 2011/0166731 | A1 | 7/2011 | Kristinsson et al. |
| 2012/0010767 | A1 | 1/2012 | Phillips et al. |
| 2013/0024055 | A1 | 1/2013 | Hysko et al. |
| 2014/0228168 | A1 | 8/2014 | Kaufman et al. |
| 2017/0176195 | A1 | 6/2017 | Rajagopalan et al. |
| 2018/0154898 | A1* | 6/2018 | Wrobel ................ B60W 10/26 |
| 2019/0063354 | A1 | 2/2019 | Augst |

OTHER PUBLICATIONS

Li et al., "Minimum Fuel Control Strategy in Automated Car-Following Scenarios", IEEE Transactions on Vehicular Technology, 2012, vol. 61, No. 3., pp. 998-1007.

Li et al., "Effect of Pulse-and-Glide Strategy on Traffic Flow for a Platoon of Mixed Automated and Manually Driven Vehicles", Computer-Aided Civil and Infrastructure Engineering, vol. 30, 2015, pp. 892-905.

Xu et al., "Fuel-Optimal Cruising Strategy for Road Vehicles With Step-Gear Mechanical Transmission", IEEE Transactions on Intelligent Transportation Systems, vol. 16, No. 6, 2015, pp. 3496-3507.

Xu et al., "Fuel-Saving Cruising Strategies for Parallel HEVs", IEEE Transactions on Vehicular Technology, vol. 65, No. 6, 2016, pp. 4676-4686.

Muller et al., "Coasting—Next Generation Start/Stop Systems", Powertrain Cover Story, 2010, vol. 72, pp. 14-18.

Serrao et al., "ECMS as a realization of Pontryagin's minimum principle for HEV control", American Control Conference, 2009, pp. 3964-3969.

Stockar et al., "Energy-Optimal Control of Plug-in Hybrid Electric Vehicles for Real-World Driving Cycles", IEEE Transactions on Vehicular Technology, vol. 60, No. 7, 2011, pp. 2949-2962.

Lin et al., "Power Management Strategy for a Parallel Hybrid Electric Truck", IEEE Transactions on Control Systems Technology, vol. 11, No. 6, 2003, pp. 839-849.

Niu et al., "Intelligent HEV Fuzzy Logic Control Strategy Based on Identification and Prediction of Drive Cycle and Driving Trend", World Journal of Engineering and Technology, vol. 3, 2015, pp. 215-226.

Sun et al., "Investigating adaptive-ECMS with velocity forecast ability for hybrid electric vehicles", Applied Energy, vol. 185, 2017, pp. 1644-1653.

Onori et al., "On Adaptive-ECMS strategies for hybrid electric vehicles", IFP Energies Nouvelles, 2011, 7 pages.

Leroy et al., "Toward Real-Time Optimal Energy Management of HEV Powertrains Using Stochastic Dynamic Programming", IEEE Vehicle Power and Propulsion Conference, 2012, pp. 383-388.

Mueller et al., "Next Generation Engine Start/Stop Systems: Free Wheeling", SAE Int. J. Engines, vol. 4, No. 1, 2011, pp. 874-887.

* cited by examiner

HYBRID VEHICLE TRANSMISSION CONTROL USING DRIVER STATISTICS

BACKGROUND

Systems and methods described herein relate to powertrain system control for hybrid electric vehicles. In particular, some embodiments relate to systems and methods for regulating the operation of an internal combustion engine and electric motor(s), or alternatively, a fuel cell system and electric motor(s), to achieve target system performance. Target system performance includes determining when to operate the vehicle with the internal combustion engine in an "off" state, or alternatively, when to operate the vehicle with the fuel cell system in an "off" state. Systems and methods described herein use an internal combustion engine as one power source example, but not limited to this example. Same systems and methods described herein are also applied for other power sources such as fuel cell system.

SUMMARY

Some of the examples described herein provide a three-layer control mechanism to optimize a performance metric of a hybrid electric vehicle (e.g., fuel efficiency) while also operating within defined tolerances for additional performance parameters including, for example, drivability and NVH (i.e., noise, vibration, & harshness). The hybrid electric vehicle includes an internal combustion engine and one or more electric motors. A first layer generates a policy that defines target engine & motor operating settings for each of a plurality of possible driver demand inputs based on a predicted driver demand profile for a long-horizon period of time. A second layer determines a predicted "short-horizon" driver demand—based, for example, on historical driver data and one or more environmental sensor inputs—and applies a corrective preadjustment to the operating settings of the vehicle in response to determining that a preadjustment is required in order to apply the target operating settings for the predicted driver demand. A third layer determines constraints to the operating settings required to comply with the additional performance parameters and limits the operating settings applied to the engine and motor(s) to feasible operating settings defined by the constraints.

The first-layer control mechanism determines a predicted driver demand profile for the "long-horizon" period of time (e.g., predicted vehicle torque and vehicle speed demand by a driver over the course of the long-horizon period of time) based, for example, on historic demand data recorded for the driver and external information such as real-time traffic information. An expected total energy consumption for the "long-horizon" period is calculated based on the predicted driver demand profile for the long-horizon period and used to generate a "long-horizon" policy for engine/motor(s) control. The long-horizon policy defines, for a plurality of possible driver demand inputs, a target set of operating settings including a target engine torque, a target engine speed, target motor torque(s), and target motor speed(s). The policy also defines, for each of the plurality of possible driver demand inputs, whether the vehicle is to be operated with the engine running or with the engine in an "off" state and, in some cases, a target state-of-charge for the vehicle battery. In some implementations, the policy is designed to maintain a target state-of-charge of a vehicle battery and to provide a target fuel efficiency over the long-horizon period of time.

The second-layer control mechanism determines a predicted driver demand for a "short-horizon" period of time (e.g., 25 seconds) based, for example, on historic driver demand data and environment information (e.g., vehicle camera data, vehicle range sensor data, etc.). Based on the policy defined by the first-layer control mechanism, the second-layer control mechanism determines a set of target operating settings based on the "short-horizon" driver demand prediction and determines whether the target operating settings can be reached. If not, then the second-layer control mechanism applies a corrective pre-adjustment to one or more of the operating settings to enable the operating setting to reach the target operating settings for the predicted short-horizon driver demand.

The third-layer control mechanism monitors actual driver demand input and determines applicable operating settings constraints required to comply with the additional performance parameters. For example, given a current engine speed and a current engine torque, the third-layer control mechanism determines a maximum engine speed setting that can be applied without inducing unacceptable levels of noise, vibration, and harshness (NVH). Based on the determined constraints, the third-layer control mechanism determines a set of feasible operating settings and, based on the actual driver demand input, the system determines a set of target operating settings using the policy generated by the first-layer control mechanism. If the set of target operating settings does not violate any constraints defined by the third-layer control mechanism, then the engine and motor(s) are operated according to the set of target operating settings. However, if the set of target operating settings would violate any constraints defined by the third-layer control mechanism, then the engine and motor(s) are operated according to the set of feasible operating settings defined by the third-layer control mechanism.

In one embodiment, the invention provides a hybrid vehicle system including an electronic controller configured to transmit control signals to control the operation of a combustion engine, one or more electric motors, and a hybrid transmission of a hybrid vehicle. The electronic controller is configured to generate a control policy defining a target set of operating settings for the hybrid vehicle corresponding to each of a plurality of possible driver demand inputs. The control policy is generated based on stored historic driver demand information. A short-horizon driver demand is also predicted based on the stored historic drive demand information and driving environment information. A pre-adjustment is applied to one or more operating settings of the hybrid vehicle in response to determining that, due to vehicle component limitations, a target set of operating settings defined by the control policy for the predicted short-horizon driver demand cannot be applied within a defined time period. The electronic controller also determines, based on the control policy, a target set of operating settings for a current actual driver demand and transmits control signals to operate the combustion engine, the electric motor(s), and the hybrid transmission based on the target set of operating settings for the current actual driver demand.

In another embodiment, the invention provides a method for operating a hybrid vehicle including a combustion engine, one or more electric motors, and a hybrid transmission of a hybrid vehicle. A control policy is generated that defines a target set of operating settings for the hybrid vehicle corresponding to each of a plurality of possible driver demand inputs. The control policy is generated based on stored historic driver demand information. A short-horizon driver demand is also predicted based on the stored historic drive demand information and driving environment information. A pre-adjustment is applied to one or more operating settings of the hybrid vehicle in response to determining that, due to vehicle component limitations, a target set of operating settings defined by the control policy for the predicted short-horizon driver demand cannot be applied within a defined time period. Based on the control policy, a target set of operating settings is determined for a current actual driver demand and control signals are transmitted to operate the combustion engine, the electric motor(s), and the hybrid transmission based on the target set of operating settings for the current actual driver demand.

Other aspects, features, and embodiments will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more input/output interfaces, one or more application specific integrated circuits (ASICs), and various connections (for example, a system bus) connecting the various components.

Figure 1:
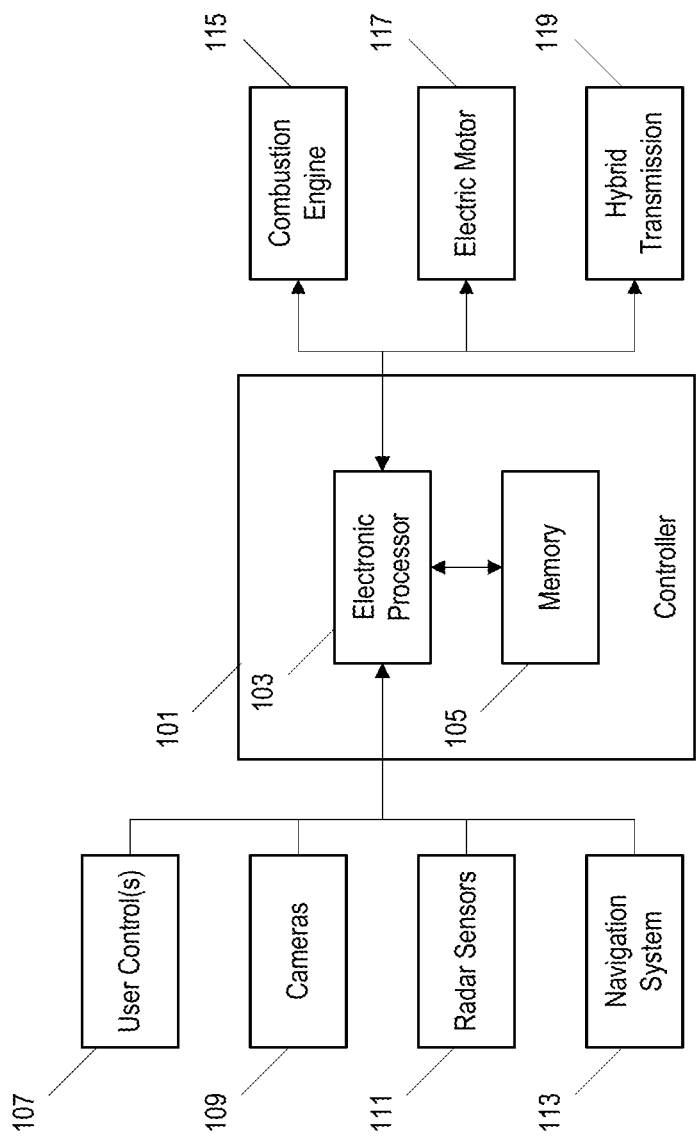
FIG. 1 is a block diagram of a control system for a hybrid electric vehicle according to one embodiment.

FIG. 1 illustrates a control system for a hybrid electric vehicle. The hybrid vehicle includes an internal combustion engine 115, one or more electric motors 117, and a power distribution unit 119. A power distribution unit can be mechanical hybrid transmission for engine/electric hybrid system or electrical power unit for fuel-cell/electric hybrid system. The power distribution unit 119 is operated by a controller 101 to regulate relative amounts of motive power provided to the drivetrain of the hybrid vehicle by the internal combustion engine 115 and the electric motor(s) 117. In some implementations, the power distribution unit 119 is also configured to control operation of the electric motor(s) 117 for functions such as regenerative braking and to control operation of the combustion engine 115 for charging a battery system of the hybrid vehicle. In some implementations, the power distribution unit 119 may be further configured to control asymmetric application of motive force to individual wheels of the hybrid vehicle.

In the examples described herein, the hybrid vehicle is described as a four-wheeled hybrid electric car. However, the systems and methods described herein can be applied to various other types and designs of vehicles or other operative machinery. For example, in various different implementations, the hybrid vehicle 115 may by an automobile, a motorcycle, a truck, a bus, a semi-tractor, or other type of vehicle. In other implementations, the systems and methods described herein might be applied to non-vehicle systems in which a combustion engine and electric motor(s) are operated in coordination to provide operating power for the same mechanism mechanism.

As illustrated in the example of FIG. 1, the controller 101 includes an electronic processor 103 and a non-transitory computer-readable memory 105. The memory 105 stores data and instructions that, when executed by the electronic processor 103, provide various functionality of the controller 101 including, for example, some or all of the functionality described herein. The controller 101 is communicatively coupled to the combustion engine 115, the electric motor(s) 117, and the power distribution unit 119 and configured to control the operation of these vehicle systems by transmitting control signals to the respectively components. The controller 101 is also communicatively coupled to one or more user input controls 107 (e.g., an accelerator pedal, a brake pedal, a steering wheel, etc.).

In addition to storing computer-executable instructions, in some implementations, the memory 105 is also configured to store additional information regarding the vehicle and/or one or more drivers of the vehicle. For example, the memory 105 may be configured to store historic driver demand information (e.g., actual vehicle torque and/or speed demand based on driver input over a period of time as the driver operates the vehicle along a route from home to work), component limits (e.g., maximum engine speed/torque, maximum motors speed(s)/torque(s), maximum rate of change of engine/motor operating settings, etc.), performance constraints (e.g., drivability and NVH (noise, vibration, harshness) targets/limits), and performance targets (e.g., a target average state-of-charge of a battery system, a target fuel efficiency, etc.).

In some implementations, the hybrid vehicle is also equipped with various environmental sensors configured to capture data indicative of the environment in which the hybrid vehicle is operating. For example, the hybrid vehicle may be equipped with one or more cameras 109 configured to capture image data of areas in front of, behind, around, and/or on either side of the hybrid vehicle. The hybrid vehicle may also be equipped with one or more radar sensors 111 configured to generate signals indicative of a distance between the hybrid vehicle and other nearby objects. As illustrated in FIG. 1, these environmental sensors (e.g., cameras 109 and radar sensors 111) are communicatively coupled to the controller 101 and configured to provide sensed data (or signals indicative of sensed data) to the controller 101.

In some implementations, the controller 101 is also communicatively coupled to other information and/or driving assistance systems. For example, in the example of FIG. 1, the controller 101 is communicative coupled to a navigation system 113. The navigation system 113 is configured to provide turn-by-turn driving directions to a driver of the hybrid vehicle and, in the example of FIG. 1, to provide information regarding an intended route of travel to the controller 101. Other examples of information or driving assistance systems that may be configured to communicate with the controller 101 include, for example, GPS systems configured to provide a signal to the controller 101 indicative of a current geographical location of the hybrid vehicle and weather systems configured to provide information to the controller 101 regarding weather conditions at the current location of the vehicle and/or along an intended route of travel.

The controller 101 is communicatively connected to the various other components (e.g., the user controls 107, the cameras 109, the radar sensors 111, the navigation system 113, the combustion engine 115, the electric motor(s) 117, and the power distribution unit 119) via various wired and/or wireless connections. For example, in some implementations, the controller 101 is directly coupled via a dedicated wire to each of the above-listed components of the hybrid vehicle. In other implementations, the controller 101 is communicatively coupled to one or more of the components via a shared communication link such as a vehicle communication bus (e.g., a controller area network (CAN) bus) or a wireless connection. Each of the components of the hybrid vehicle may be configured to communicate with the controller 101 using various communication protocols. The configuration illustrated in FIG. 1 provides but one example of the components and connections of the hybrid vehicle. However, these components and connections may be constructed in other ways and may include other components instead of or in addition to those illustrated in the example of FIG. 1.

In various different implementations, the controller 101 of FIG. 1 may be configured to control the operation of the combustion engine 115, the electric motor(s) 117, and the power distribution unit 119 to optimize hybrid vehicle performance metrics based on accumulated, stored driver statistics. Such control mechanism may be based on determining a probability of driver demand based on stored historical data regarding, for example, desired vehicle acceleration and velocity based on user control input for particular driving routes and conditions. For example, a driver may frequently operate the vehicle along a same route under similar conditions (e.g., driving from home to work at approximately the same time each day). By accumulating driver demand information from this routes, the system will be able to predict a driver demand profile for future operation of the vehicle by the same driver along the same route in a way that is steady and not sensitive to instantaneous demand changes. The control architecture utilizes this predicted probability to determine an optimized control strategy for the expected energy demand. The control architecture can be configured, for example, to regulate the state-of-charge of the battery system of the hybrid vehicle within a desired range while also providing optimal operation of the components at a system level.

Figures 2, 3:
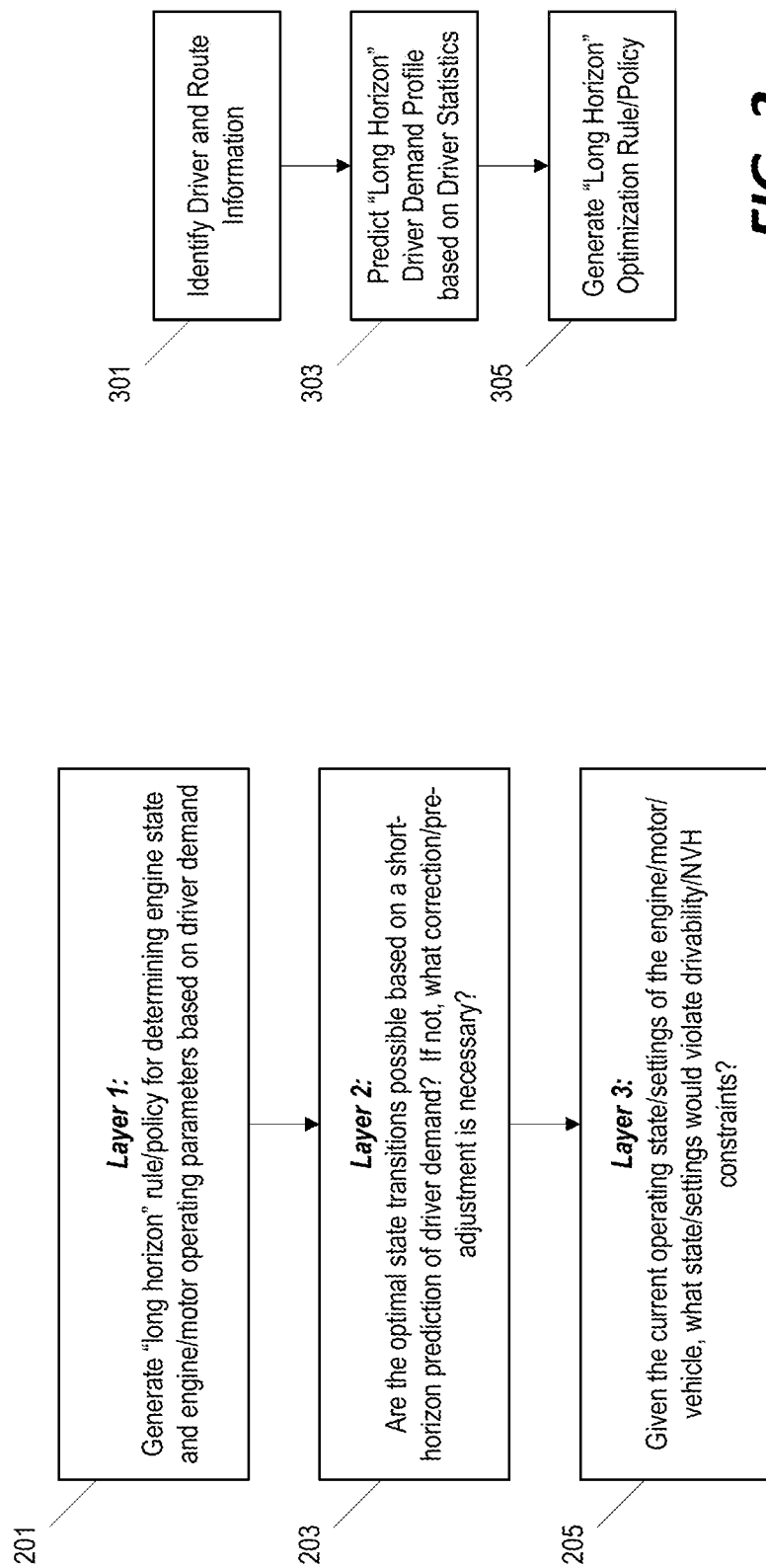
FIG. 2 is a flowchart of a three-layer control mechanism for operating the hybrid electric vehicle using the control system of FIG. 1.
FIG. 3 is a flowchart of a method for generating a control policy for the hybrid electric vehicle based on a predicted long-horizon driver demand profile according to a first layer of the three-layer control mechanism of FIG. 2.

FIG. 2 illustrates an example of a three-layer control mechanism for operating the hybrid vehicle. In Layer 1 (step 201), the controller 101 generates a "long horizon" rule/policy for determining engine state and engine/motor operating parameters based on driver demand. In Layer 2 (step 203), the controller 101 determines whether transitions to optimal operating settings for a short-horizon prediction of driver demand are possible and, if not, what correction or pre-adjustment to operating settings may be necessary. In Layer 3 (step 205), the controller 101 determines what values and adjustments for the vehicle states and operating settings would violate certain defined vehicle performance constraints.

The "long horizon" policy generated by Layer 1 is configured to identify a set of target operating settings for the vehicle for each of a plurality of possible driver demand inputs. Accordingly, as discussed in further detail below, in response to receiving a particular driver demand input (e.g., a vehicle speed demand and/or a vehicle torque demand) through the user controls 107, the "long horizon" policy outputs a set of target operating settings for the hybrid vehicle including, for example, motor torque(s), motor speed(s), an engine torque, and an engine speed. The "long horizon" policy generated by Layer 1 may be provided, for example, in the form of a look-up table or a mathematical formula configured to receive the driver demand as an input and to produce a set of target operating settings as an output.

In some implementations, this long horizon policy generated by Layer 1 is generated by first determining a probability of driver demand over a long-horizon period of time based on stored historic driver demand data (for all drivers or for a single individual driver) and traffic information. In some implementations, the controller 101 calculates an expected energy consumption over a long-horizon period of time based on the demand probability. In some implementations, the long-horizon policy generated by Layer 1 provides an optimization algorithm that minimizes fuel consumption expectation $\bar{f}_{EFC}$ based on the driver demand probability while also satisfying the energy balance necessary to maintain a state-of-charge of the battery within an allowable range over the long horizon period of time as shown in Equation (1), where $\eta_{demand}(T_v, \omega_v)$ refers to the probability of driver demand in terms of demanded vehicle torque $T_v$ and vehicle speed $\omega_v$, and $f_{EFC}(T_v, \omega_v)|_{engine-on}$ refers to the fuel consumption optimized under the referred driver demand when the engine is on.

$$\min f = \bar{f}_{EFC} = \Sigma \eta_{demand}(T_v, \omega_v) * f_{EFC}(T_v, \omega_v)|_{engine-on} \quad (1)$$

In some implementations, the "long horizon" period of time is a period of a defined duration while, in other implementations, the long horizon period of time is determined based on a known or predicted driving route. For example, the "long horizon period of" time may be defined, in some implementations, as an estimated amount of time for a vehicle to travel from its current location to a destination. Accordingly, in some implementations, the controller 101 is configured to process information such as driver statistics, traffic information, and time of day in order to determine the duration of the long-horizon period of time and to also predict the driver demand that is expected during that long-horizon period of time.

In some implementations, Layer 2 is configured to predict driver demand over a short-horizon period of time. While the long-horizon driver demand prediction of Layer 1 may be based on information such as predicted driver route, current traffic, etc., Layer 2 is configured to predict the short-horizon driver demand based on historical driver statistics as well as immediate environment information including, for example, data from vehicle cameras and sensors regarding the presence of other nearby vehicles. For example, if the sensor data indicates that the hybrid vehicle is approaching another vehicle from behind, the short-horizon driver demand prediction may indicate that the driver is likely to decelerate the vehicle.

The short-horizon period of time is shorter than the long-horizon period of time. For example, in some implementations, the long-horizon period of time is determined based on an estimated amount of time until the vehicle arrives at its destination while the short-horizon period of time is defined as a period of a few seconds (e.g., 25 seconds). Based on the predicted short-horizon driver demand, Layer 2 uses the policy generated by Layer 1 to determine the target engine state and operating settings for the predicted driver demand and also determines whether the engine and the motor(s) can be operated to reach the target settings/states for the predicted driver demand within a defined time step. If the controller determines in Layer 2 that the engine/motor(s) cannot be operated to achieve the target settings/states for the predicted short-horizon driver demand, then the controller will apply a correction or pre-adjustment in order to enable the vehicle to attain the target settings/states. Accordingly, while Layer 1 defines a policy for determining operating settings based on a driver demand input, Layer 2 determines adjustments that may be necessary to achieve the performance/settings prescribed by the defined policy of Layer 1.

Depending on a particular operating state of the vehicle engine and/or motor(s), certain adjustments may cause the vehicle to experience unacceptable decreases in "drivability" or unacceptably high noise, vibration, and harshness. For example, an immediate transition from an "engine off" state to a state where the engine provides a relatively high level of torque may cause the vehicle to experience sudden vibrations. Sudden changes in operating settings may also cause the vehicle to experience harshness or inconsistent performance. Accordingly, in Layer 3, the controller 101 determines control constraints based, for example, on the actual current driver demand, current operating settings, and system/component limitations. In some implementations, these control constraints determined by Layer 3 indicate the maximum and/or minimum values of operating settings that can be applied without violating performance metrics based, for example, on drivability and NVH (noise, vibration, and harshness).

Using this three-layer control mechanism, the controller 101 determines and controls operating states and settings for the combustion engine 115, the electric motor(s) 117, and the power distribution unit 119. For example, in response to receiving an actual driver demand input, the controller 101 determines an appropriate set of target operating settings based on the policy generated by Layer 1. Before applying those target operating settings, the controller 101 determines whether any correction or pre-adjustment is necessary (for predicted future performance) using Layer 2 and whether the target/corrected operating settings would violate any performance constraints.

The three-layer control mechanism of FIG. 2 can be implemented in various different ways including, for example, computer-executable instructions stored on the memory 105 of the controller 101. FIG. 3 illustrates an example of a method performed by the controller 101 for the first layer of the three-layer control mechanism of FIG. 2. First, the controller 101 identifies the driver and route information (step 301). In some implementations, the controller 101 may be configured to identify the driver, for example, based on the particular key used to start the vehicle or other identifying information for the driver received by the vehicle system. The controller 101 may be configured to identify the intended route based, for example, on a route programmed into a vehicle navigation system or on historical driver statistics (e.g., if the driver operates the vehicle along the same route every day at the same time). Once the driver is identified, historical driver demand information for that driver is accessed from a memory and used to predict a "long-horizon" driver demand profile (step 303). In some implementations, the controller 101 is configured to generate a long-horizon driver demand profile as an identification and quantification of different combinations of driver inputs (e.g., vehicle speed demand, vehicle torque demand, etc.) and changes to driver inputs that are expected to be received over the course of the long-horizon period. Based on this estimated driver demand profile, the controller 101 generates a long horizon optimization policy (step 305). In this example, the long horizon optimization policy is generated in the form of a look-up table that defines a set of target operating settings for the combustion engine and the electric motor(s) for each of a plurality of different driver demand inputs.

Figure 4:
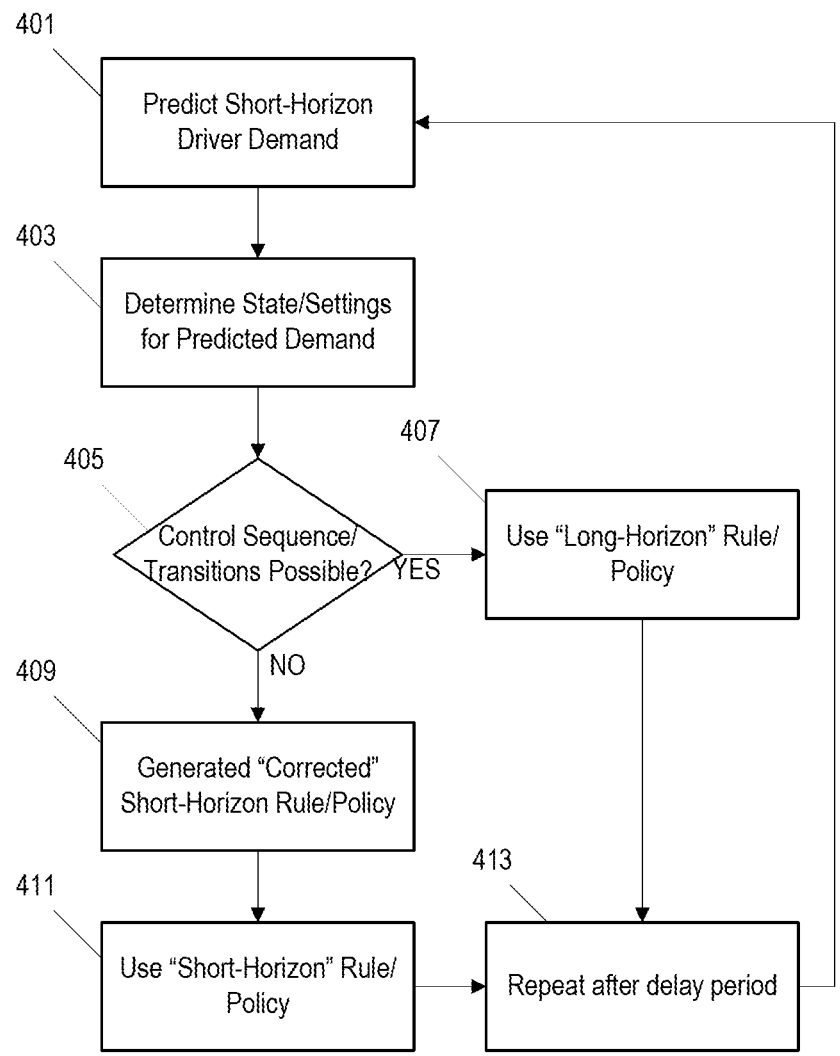
FIG. 4 is a flowchart of a method for applying corrective pre-adjustments to vehicle operating settings based on a predicted short-horizon driver demand according to the second layer of the three-layer control mechanism of FIG. 2.

FIG. 4 illustrates an example of a method performed by the controller 101 for the second layer of the three-layer control mechanism of FIG. 2. In the second layer, the controller 101 predicts a short-horizon driver demand—that is, a predicted sequence of driver inputs over a short period of time (e.g., 25 seconds). The controller 101 may be configured to predict the short-horizon driver demand based on stored driver statistics and additional environmental information (e.g., from cameras, proximity sensors, etc.). For example, it sensor data received indicates that the vehicle is approaching another vehicle from behind, the controller 101 may be configured to predict the short-horizon driver demand based on stored historical data indicative of how the same driver responded to a similar situation previously.

Once the short-horizon driver demand is predicted, the controller 101 uses the policy generated by the first layer to determine appropriate states and operating settings corresponding to the predicted short-horizon driver demand (step 403). The controller 101 then evaluates whether the states and operating settings defined by the Layer 1 policy for the predicted short-horizon driver demand can be implemented based, for example, on vehicle actuator limitations (step 405). For example, it may not be possible for the combustion engine to transition from an "engine off" state to an operating settings where the combustion engine provide relatively high level of torque in only several seconds (or time steps).

If the state and operating setting transitions defined by the Layer 1 Policy for the predicted short-horizon driver demand can be implemented by the vehicle systems, then the second layer control mechanism takes no additional corrective action based on the predicted short-horizon driver demand and the Layer 1 Policy is used to control the operation of the engine, motor(s), and transmission as described in further detail below (step 407). However, if the state and operating setting transitions defined by the Layer 1 Policy for the predicted short-horizon driver demand cannot be implemented by the vehicle system, the second layer control mechanism takes corrective action to ensure that the defined state and operating settings can be implemented. For example, in example of FIG. 4, the controller 101 is configured to generate a "corrected" short-horizon policy (step 409) that is used instead of the Layer 1 Policy for a short, defined period of time (step 411). The corrected short-horizon policy includes pre-adjustments to various engine states and operating settings such that, if the actual driver demand matches the predicted short-horizon driver demand, the target states and operating settings defined by the Layer 1 Policy can be reached after a defined time step.

For example, if the controller 101 is currently operating the vehicle in an "engine off" state and the predicted short-horizon driver demand indicates that the driver will likely increase the vehicle torque or speed demand such that the engine will need to operate at a relatively high torque level, the short-horizon policy generated by the controller 101 at the second layer may be configured to indicate that the combustion engine should be transitioned to the "engine on" state at a lower actual driver demand such that the engine torque can be gradually increased to the required operating setting if the actual driver demand continues over the short-horizon period of time as predicted by the second layer of the control mechanism.

The method of FIG. 4 is repeated periodically (e.g., after a defined delay period) (step 413) during which the controller 101 will determine whether to return to control based on the Layer 1 Policy, to continue using a corrected Layer 2 Policy, or to generate a new corrected layer 2 Policy.

Figure 5:
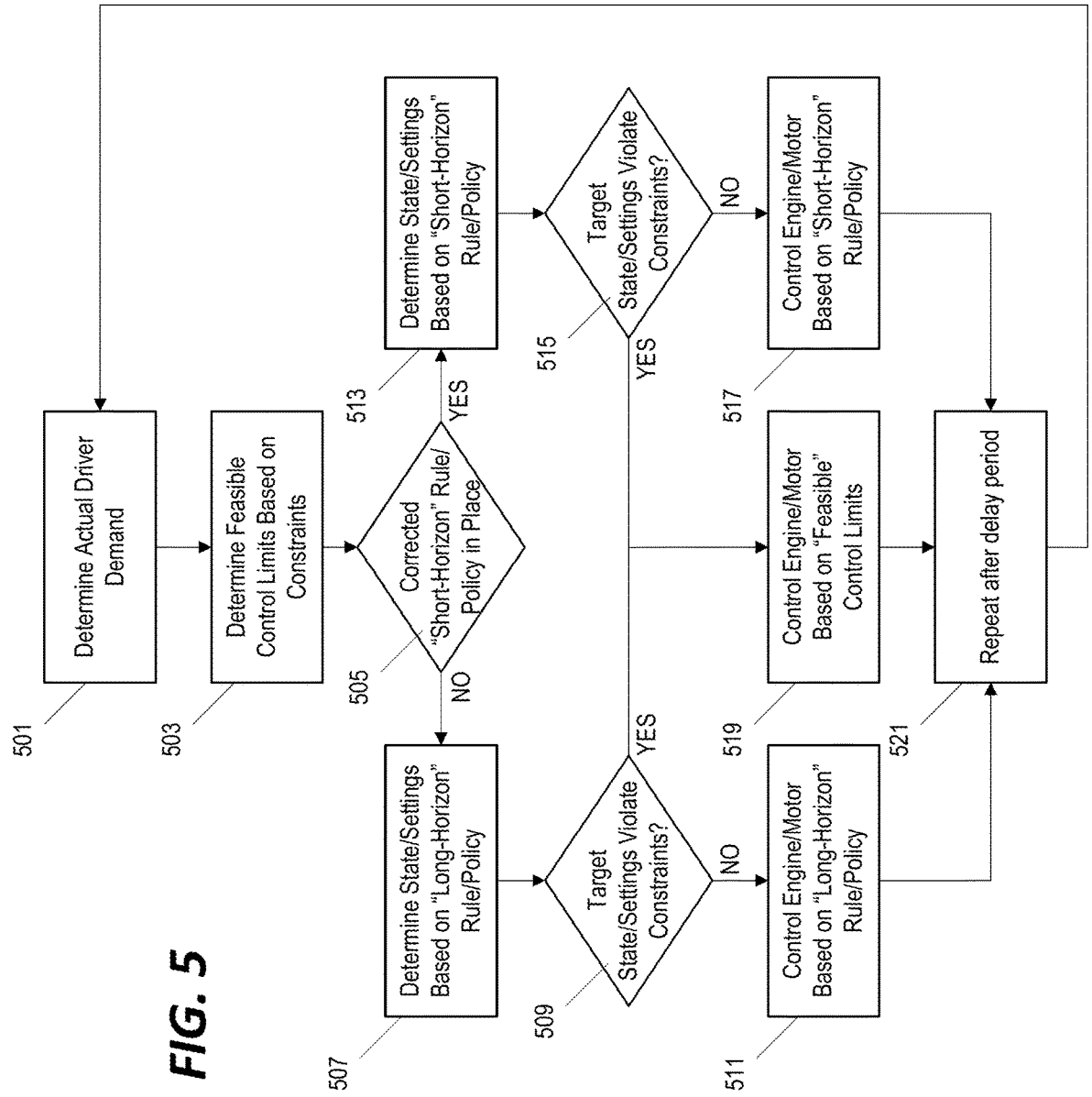
FIG. 5 is a flowchart of a method for operating the engine and motor(s) of the hybrid electric vehicle within determined performance constraints according to the third layer of the three-layer control mechanism of FIG. 2.

FIG. 5 illustrate an example of a method performed by the controller 101 for the third layer of the three-layer control mechanism of FIG. 2 and for control synthesis (i.e., for determining and applying state and operating settings to the vehicle systems based on actual driver demand inputs). First, the controller 101 determines an actual driver demand based, for example, on inputs received through the user controls of the hybrid vehicle (e.g., the accelerator pedal, the brake pedal, etc.) (step 501). The controller 101 then determines feasible control limits based on performance constraints (step 503). For example, in some implementations, the controller 101 may be configured to determine maximum and/or minimum values for various different state and operating settings that can be applied to the vehicle systems (either immediately or over a period of time) that would not cause unacceptably high noise, vibration, or harshness and that would not have an unacceptable effect on the drivabilty of the hybrid vehicle.

If a corrected short-horizon policy is not currently in place by the second layer of the control mechanism (e.g., from FIG. 4) (step 505), then the controller 101 uses the Layer 1 Policy to determine an appropriate set of states and operating settings for the actual driver demand (step 507) and determines whether any of those states or operating settings would violate the performance constraints (step 509) (i.e., whether any of the states and operating settings exceed the maximum or minimum feasible values determined at step 503). If the set of states and operating settings defined by the Layer 1 Policy for the current actual driver demand would not violate any of the performance constraints, then the controller 101 operates the engine, motor(s), and transmission based on the output of the Layer 1 Policy (step 511). However, if the set of states and operating settings defined by the Layer 1 Policy would violate the performance constraints, then the controller 101 operates the engine, motor(s), and transmission based on the set of feasible states and operating settings as determined by the third layer control mechanism (step 519).

Similarly, if a corrected short-horizon policy is currently in place by the second layer of the control mechanism (e.g., from FIG. 4) (step 505), then the controller 101 uses the corrected Layer 2 Policy to determine an appropriate set of states and operating settings for the actual driver demand (step 513) and determines whether any of those states or operating settings would violate the performance constraints (step 515) (i.e., whether any of the states and operating settings exceed the maximum or minimum feasible values determined at step 503). If the set of states and operating settings defined by the corrected Layer 2 Policy for the current actual driver demand would not violate any of the performance constraints, then the controller 101 operates the engine, motor(s), and transmission based on the output of the corrected Layer 2 Policy (step 517). However, if the set of states and operating settings defined by the corrected Layer 2 Policy would violate the performance constraints, then the controller 101 operates the engine, motor(s), and transmission based on the set of feasible states and operating settings as determined by the third layer control mechanism (step 519).

The method of FIG. 5 is repeated continuously (step 521) to respond to changes in the actual driver demand by determining and applying a new set of state and operating settings.

In the example described above, the controller 101 is configured to determine whether any state or operating setting of the set of states and operating settings defined by the policy exceeds a maximum or minimum value determined by the third layer control mechanism and, if so, the controller 101 applies the maximum or minimum value instead. However, in some implementations, the controller 101 is instead configured to use another comparison to determine whether the set of states and operating settings defined by the policy would violate the performance constraints. For example, the controller 101 may be configured to apply a mathematical model to determine whether a particular combination of values (including, for example, the current operating states/settings, the target operating states/settings defined by the policy, and other sensor values) would violate any particular performance constraint. Furthermore, in some implementations, in response to determining that the combination of states and operating settings defined by the Layer 1 Policy or the Layer 2 Policy would violate performance constraints for the hybrid vehicle, the controller 101 is configured to determine a new feasible set of states and operating parameters that can provide or nearly provide the driver demand (e.g., a demanded vehicle speed or demanded vehicle torque) without violating the performance constraints and applies this determined feasible set of states and operating parameters to the engine, motor(s), and transmission.

The examples described above in FIGS. 3, 4, and 5 outline methods for each of the three layers of the control mechanism of FIG. 2 and are designed to be performed by the controller 101 in coordination. However, the methods of FIGS. 3, 4, and 5 are not necessarily performed by the controller 101 is sequence. For example, in some implementations, the controller 101 may be configured to repeat the method of FIG. 3 to generate a new control policy periodically upon expiration of the long-horizon period of time and, similarly, to repeat the method of FIG. 4 upon expiration of the short-horizon period of time. In other implementations, the controller 101 may be configured to repeat the method of FIG. 4 more frequently (i.e., to repeat the method of FIG. 4 before the expiration of the short-horizon period of time) so that the controller 101 can more quickly adapt to deviations between actual driver demand and the predicted short-horizon driver demand. In some implementations, the method of FIG. 5 is repeated at the same frequency as the method of FIG. 4 while, in other implementations, the method of FIG. 5 is repeated more frequently than the method of FIG. 4.

Furthermore, the methods of FIGS. 3, 4, and 5 are only one example of an implementation of the three-layer control mechanism of FIG. 2. Other implementations may include other specific steps and control strategies for each layer of the three-layer functionality. For example, FIGS. 6 and 7 illustrate an alternative example of methods that may be performed by a controller 101 for the second and third layers of the three-layer control mechanism of FIG. 2.

In FIG. 6, the controller 101 again predicts a sequence of driver demand inputs over a short-horizon period of time based on sensed environment data (e.g., camera image data, proximity sensor signals, etc.) and stored historic driver demand data/statistics (step 601). The controller 101 uses the Layer 1 Policy to determine a target set of states and operating settings corresponding to each driver demand of the predicted short-horizon driver demand sequence (step 603) and determines whether the sequence of states and operating settings is possible (step 605). If the states and operating settings defined by the Layer 1 Policy for the predicted short-horizon driver demand sequence can be implemented by the vehicle systems, then the controller 101 takes no further action at the second layer and, as discussed further below, the Layer 1 Policy is used to control the operation of the vehicle systems based on actual driver demand. However, if the controller 101 determines that the states and operating settings defined by the Layer 1 Policy for the predicted short-horizon driver demand sequence cannot be implemented on the vehicle systems due to component limitations, the controller 101 determines and applies an appropriate pre-adjustment to the engine and/or motor actuators (step 607). The controller 101 is configured to determine a pre-adjustment that will enable the vehicle systems to implement the states and operating settings as defined by the Layer 1 Policy within a defined time step. For example, the pre-adjustment may include transitioning the engine from an "engine off" state to an "engine on" state. As another example, the pre-adjustment may include increasing the engine speed or engine torque while adjusting the hybrid transmission to apply a lower percentage of power from the engine to the vehicle drivetrain—in this way, the engine speed/torque is adjusted towards the operating setting that would be required for a future predicted driver demand, but the actual performance of the vehicle (e.g., vehicle speed, vehicle torque, etc.) is not affected by the pre-adjustment.

Figure 6:
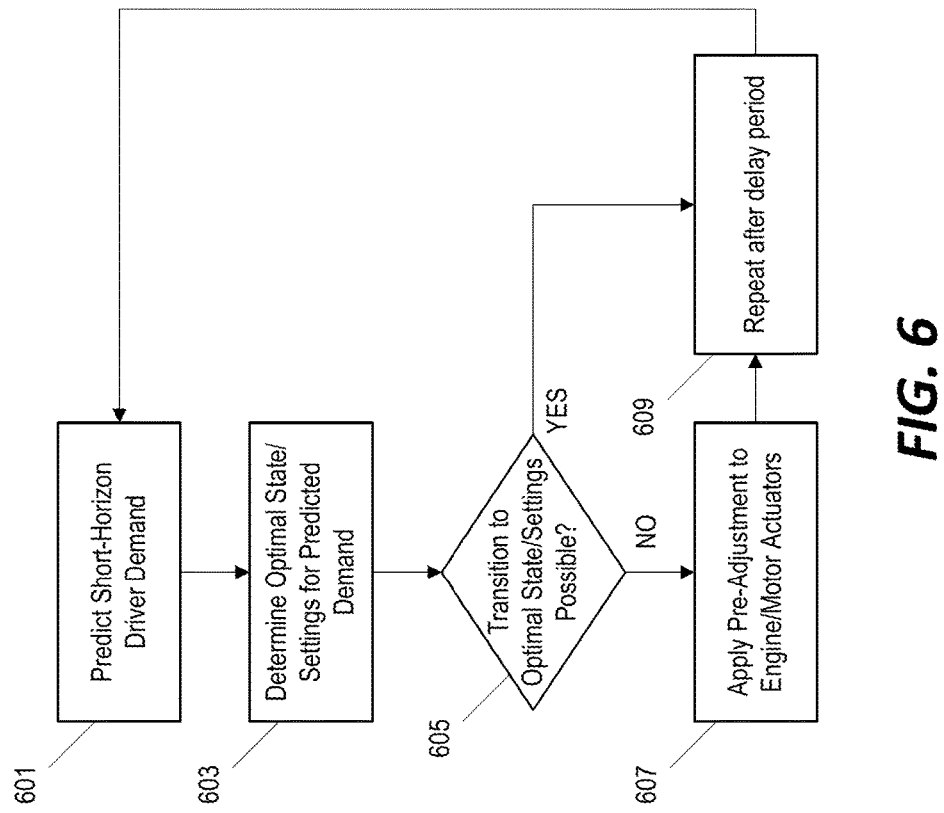
FIG. 6 is a flowchart of an alternate method for applying corrective pre-adjustments to vehicle operating settings based on a predicted short-horizon driver demand according to the second layer of the three-layer control mechanism of FIG. 2.

Accordingly, as illustrated in the example of FIG. 6, in the second layer of the three-layer control mechanism, the controller 101 can be configured to provide a corrective adjustment necessary to achieve predicted short-horizon performance without generating an entirely new corrected short-horizon policy.

Figure 7:
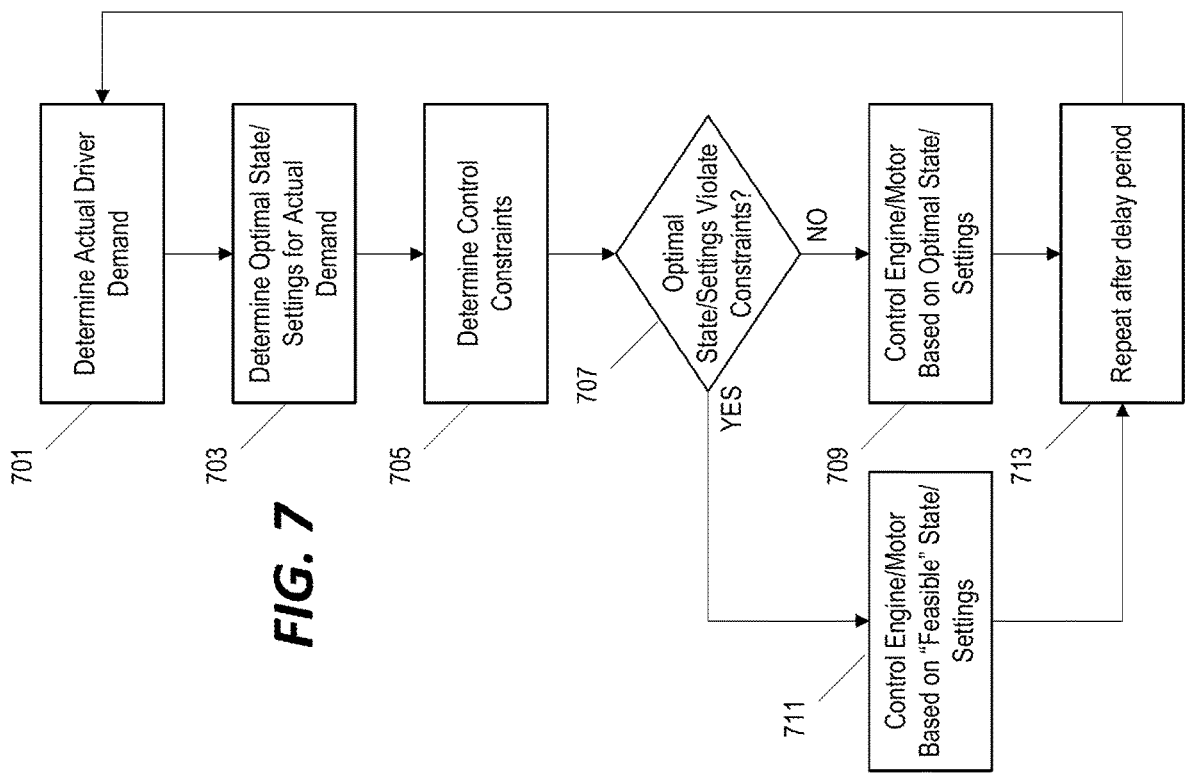
FIG. 7 is a flowchart of an alternate method for operating the engine and motor(s) of the hybrid electric vehicle within defined performance constraints according to a third layer of the three-layer control mechanism of FIG. 2.

FIG. 7 illustrates an alternate method implemented by the controller 101 for providing the third layer of the control mechanism. The controller 101 again receives an actual driver demand based on driver input received through the user controls (step 701) and determines a target set of states and operating settings for the actual driver demand using the Layer 1 Policy (step 703). The controller 101 then determines control/performance constraints (step 705) and evaluates whether the target set of states and operating settings defined by the Layer 1 Policy would cause the hybrid vehicle to violate any performance constraints (step 707). If not, then the controller 101 simply operates the motor(s), engine, and transmission based on the target set of states and operating settings as defined by the Layer 1 Policy (step 709). However, if controller 101 determines that applying the target set of states and operating settings would cause the hybrid vehicle to violate a performance constraint (e.g., NVH performance, drivability, etc.), then the controller 101 instead determines a feasible set of states and operating settings and operates the motor(s), engine, and transmission based on the feasible set (step 711). As discussed above, the controller 101 may be configured to determine the feasible set of states and operating settings as a combination of states and operating settings that allows the vehicle to achieve (or nearly achieve) the driver demand without violating the performance constraints. The method of FIG. 7 is repeated periodically (step 713) at a frequency based on a desired level of vehicle responsiveness.

Because the method of FIG. 6 does not generate a new corrected Layer 2 Policy, the method of FIG. 7 does not need to consider whether to use the Layer 1 Policy or a corrected layer 2 Policy before determining a target set of states and operating settings. Furthermore, because, in the method of FIG. 6, the controller 101 is configured to directly apply a pre-adjustment to one or more states or operating settings, no further adjustment to the target states and operating settings as defined by the Layer 1 Policy is necessary in the third layer method of FIG. 7.

In this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Thus, this disclosure provides, among other things, systems and methods for controlling the operation of a hybrid electric vehicle using a three-layered control strategy including determining a control policy to optimize one or more vehicle performance parameters based on a long-horizon prediction of driver demand, determining real-time adjustments to the control policy that may be necessary to achieve target operating states and settings based on a short-horizon prediction of driver demand, and determining whether further adjustments to a target set of operating states and settings are necessary to prevent the hybrid vehicle from violating defined performance constraints. Various features, advantages, and embodiments are set forth in the following claims.

The invention claimed is:

1. A hybrid vehicle system comprising:
an electronic controller configured to
generate a control policy defining a target set of operating settings for a hybrid vehicle corresponding to each of a plurality of possible driver demand inputs, wherein the control policy is generated based on stored historic driver demand information, wherein the control policy defines driver demand conditions under which the electronic controller will cause the combustion engine to transition between an engine off state and an engine on state
predict a short-horizon driver demand based on the stored historic driver demand information and driving environment information,
apply a pre-adjustment to one or more operating setting in response to determining that, due to vehicle component limitations, a target set of operating settings defined by the control policy for the predicted short-horizon driver demand cannot be applied within a defined time period, wherein the pre-adjustment of the one or more operating settings enables the target set of operating settings for the predicted short-horizon driver demand to be applied within the defined time period,
wherein applying the pre-adjustment includes transmitting a pre-adjustment control signal to adjust operation of at least one selected from a group consisting of a combustion engine, an electric motor, and a hybrid transmission of the hybrid vehicle,
determine a current actual driver demand, wherein the current actual driver demand includes at least one selected from a group consisting of a target acceleration and a target velocity,
determine, based on the control policy, a target set of operating settings for the current actual driver demand, and
transmit control signals to the combustion engine, the electric motor, and the hybrid transmission in response to determining the target set of operating settings for the current actual driver demand, wherein the control signals are configured to operate the combustion engine, the electric motor, and the hybrid transmission based on the target set of operating settings for the current actual driver demand.

2. The hybrid vehicle system of claim 1, wherein the controller is further configured to
determine whether the target set of operating settings for the current actual driver demand defined by the control policy would cause the hybrid vehicle to violate a performance constraint, and
in response to a determination that the target set of operating settings would cause the hybrid vehicle to violate the performance constraint, transmit control signals to operate the combustion engine, the electric motor, and the hybrid transmission based on an alternative set of feasible operating settings.

3. The hybrid vehicle system of claim 1, wherein the electronic controller is configured to generate the control policy by
predicting a long-horizon driver demand profile based on the stored historic driver demand information and current traffic information, wherein the long-horizon driver demand profile is indicative of predicted driver demand inputs for a long-horizon period of time,
calculating an expected energy consumption for the long-horizon period of time based on the long-horizon driver demand profile, and
generating a control policy based on the predicted long-horizon driver demand profile and the expected energy consumption for the long-horizon period of time.

4. The hybrid vehicle system of claim 3, wherein the electronic controller is configured to generate the control policy by generating a control policy that will achieve a target fuel efficiency and maintain a state-of-charge of a battery of the hybrid vehicle within a defined range over the long-horizon period of time based on the predicted long-horizon driver demand profile and the expected energy consumption for the long-horizon period of time.

5. The hybrid vehicle system of claim 1, wherein the stored historic driver demand information includes stored driver demand data accumulated over at least one year.

6. The hybrid vehicle system of claim 1, wherein the electronic controller is further configured to determine the driving environment information based on output data received from at least one sensor selected from a group consisting of a radar sensor, a proximity sensor, and a camera.

7. The hybrid vehicle system of claim 6, wherein the electronic controller is further configured to determine a proximity of the hybrid vehicle to another vehicle operating on a roadway, and is configured to predict the short-horizon driver demand by predicting the short-horizon driver demand based on the determined proximity, environment information, and stored historic driver demand information indicative of driver demand inputs received under similar proximity conditions.

8. The hybrid vehicle system of claim 1, wherein the electronic controller is further configured to
access a set of vehicle component limits from a memory, wherein the set of vehicle component limits defines maximum and minimum values for each operating setting and rate of change limits for each operating setting, and
determine, based on the accessed set of vehicle component limits, whether the target set of operating settings defined by the control policy for the predicted short-horizon driver demand cannot be applied within a defined time period.

9. The hybrid vehicle system of claim 1, wherein the controller is configured to determine the actual driver demand based at least in part on an accelerator pedal of the hybrid vehicle.

10. The hybrid vehicle system of claim 1, wherein the controller is configured to predict the short-horizon driver demand by predicting one or more driver inputs, and wherein the controller is configured to determine the current actual driver demand by determining an actual current driver input received through a user control of the hybrid vehicle.

11. A method for controlling operation of a combustion engine, an electric motor, and a hybrid transmission of a hybrid vehicle, the method comprising:

generating a control policy defining a target set of operating settings for the hybrid vehicle corresponding to each of a plurality of possible driver demand inputs, wherein the control policy is generated based on stored historic driver demand information, wherein the control policy defines driver demand conditions under which the electronic controller will cause the combustion engine to transition between an engine off state and an engine on state;

predicting a short-horizon driver demand based on the stored historic driver demand information and driving environment information;

applying a pre-adjustment to one or more operating setting in response to determining that, due to vehicle component limitations, a target set of operating settings defined by the control policy for the predicted short-horizon driver demand cannot be applied within a defined time period, wherein the pre-adjustment of the one or more operating settings enables the target set of operating settings for the predicted short-horizon driver demand to be applied within the defined time period, wherein applying the pre-adjustment includes transmitting a pre-adjustment control signal to adjust operation of at least one selected from a group consisting of a combustion engine, an electric motor, and a hybrid transmission of the hybrid vehicle;

determining a current actual drive demand, wherein the current actual driver demand includes at least one selected from a group consisting of a target acceleration and a target velocity;

determining, based on the control policy, a target set of operating settings for the current actual driver demand; and transmitting control signals to the combustion engine, the electric motor, and the hybrid transmission in response to determining the target set of operating settings for the current actual driver demand, wherein the control signals are configured to operate the combustion engine, the electric motor, and the hybrid transmission based on the target set of operating settings for the current actual driver demand.

12. The method of claim 11, further comprising:
determining whether the target set of operating settings for the current actual driver demand defined by the control policy would cause the hybrid vehicle to violate a performance constraint; and
in response to a determination that the target set of operating settings would cause the hybrid vehicle to violate the performance constraint, transmitting control signals to operate the combustion engine, the electric motor, and the hybrid transmission based on an alternative set of feasible operating settings.

13. The method of claim 11, wherein generating the control policy includes
predicting a long-horizon driver demand profile based on the stored historic driver demand information and current traffic information, wherein the long-horizon driver demand profile is indicative of predicted driver demand inputs for a long-horizon period of time,
calculating an expected energy consumption for the long-horizon period of time based on the long-horizon driver demand profile, and
generating a control policy based on the predicted long-horizon driver demand profile and the expected energy consumption for the long-horizon period of time.

14. The method of claim 13, wherein generating the control policy further includes generating a control policy that will achieve a target fuel efficiency and maintain a state-of-charge of a battery of the hybrid vehicle within a defined range over the long-horizon period of time based on the predicted long-horizon driver demand profile and the expected energy consumption for the long-horizon period of time.

15. The method of claim 11, wherein the stored historic driver demand information includes stored driver demand data accumulated over at least one year.

16. The method of claim 11, further comprising determining the driving environment information based on output data received from at least one sensor selected from a group consisting of a radar sensor, a proximity sensor, and a camera.

17. The method of claim 16, further comprising:
determining a proximity of the hybrid vehicle to another vehicle operating on a roadway, and
wherein predicting the short-horizon driver demand includes predicting the short-horizon driver demand based on the determined proximity, environment information, and stored historic driver demand information indicative of driver demand inputs received under similar proximity conditions.

18. The method of claim 11, further comprising:
accessing a set of vehicle component limits from a memory, wherein the set of vehicle component limits defines maximum and minimum values for each operating setting and rate of change limits for each operating setting; and
determining, based on the accessed set of vehicle component limits, whether the target set of operating settings defined by the control policy for the predicted short-horizon driver demand cannot be applied within a defined time period.

19. The method of claim 11, wherein determining the actual driver demand includes determining the actual driver demand based at least in part on an accelerator pedal of the hybrid vehicle.

20. The method of claim 11, wherein predicting the short-horizon driver demand includes predicting one or more driver inputs, and wherein determining the current actual driver demand includes determining an actual current driver input received through a user control of the hybrid vehicle.

* * * * *